Sept. 25, 1934.  K. E. PEILER  1,975,050
APPARATUS FOR MAKING GLASSWARE
Filed March 5, 1931  7 Sheets-Sheet 1

Sept. 25, 1934.　　　　K. E. PEILER　　　　1,975,050
APPARATUS FOR MAKING GLASSWARE
Filed March 5, 1931　　　7 Sheets-Sheet 4

Sept. 25, 1934.   K. E. PEILER   1,975,050
APPARATUS FOR MAKING GLASSWARE
Filed March 5, 1931   7 Sheets-Sheet 6

Patented Sept. 25, 1934

1,975,050

UNITED STATES PATENT OFFICE 1,975,050

APPARATUS FOR MAKING GLASSWARE

Karl E. Peiler, West Hartford, Conn., assignor to Hartford-Empire Company, Hartford, Conn., a corporation of Delaware Application March 5, 1931, Serial No. 520,190

31 Claims. (Cl. 49—9)

This invention relates to methods of and apparatus for forming hollow blown glassware, and relates more particularly to methods and apparatus of the type in which an article of glassware is formed by the successive application to each charge or segregated mass of glass of three molds.

The nomenclature in this particular branch of the glass art has not as yet become thoroughly fixed. Hence for a better understanding of the present invention, the following definitions are adopted. The term "feed mold" is applied to the first of the three molds to which the charge is supplied; the term "form mold" to the second or other intermediate mold applied to the charge after it has been removed from the feed mold and prior to its reception in the last, finish or blow mold. The term "blow mold" is applied to that mold which gives to the article of glassware its final shape.

Heretofore in the art where three molds have been applied successively to charges of glass, the machines used have been so designed that a major portion of the operations and particularly the operations occurring in the form mold have necessarily taken place at fixed stations, and have, by reason of this fact and other mechanical limitations in the machines, often resulted in undesirable and inefficient operations, and the necessary application of improper cycles in the formation of the article. In such machines, no provision, or very limited provision, has been made for variation within the time cycle to adapt the machine to form articles of various types each at the most efficient speed.

On the contrary, the present invention contemplates the provision of a machine avoiding these difficulties and fundamentally involving the performance of the form mold operations while the glass is moving, the time and duration of such operations being adjustable over a wide range to adapt them to the efficient production of glassware of various kinds.

The machine of the present invention may readily be applied to prior art "two-mold" machines, particularly those of the type in which the parison forming instrumentalities operate during periods of movement. In the embodiments shown in the drawings accompanying this application, the invention is shown as applied to a continuously rotating two-table forming machine, but it is obviously applicable to continuous single table machines or intermittent machines of the type in which counterblowing mechanism is provided to travel with the mold.

Among the objects of the present invention are (1) the provision of a novel "three-mold" machine wherein the form mold, or molds, acts upon the glass during the movement if the glass; (2) to provide a suitable mechanism for attachment to existing two-mold machines by which such machines may be efficiently converted into such a novel machine as set forth in (1) above; (3) to provide such a machine provided with means for suitably adjusting the time of application of the form mold and/or the duration of such application to the charge over relatively wide ranges; (4) to provide a novel method of forming glassware by the "three-mold" process in which the positive forming operations may occur at properly selected times and during the movement of the glassware.

Other and more specific objects of the invention will appear from the following specification, when considered in connection with the accompanying drawings, which show the application of additional mechanism to a continuously rotating two-table forming machine of the two-mold type and the essential modifications of the machine to which such mechanism is applied.

I have selected, as a means for illustrating my invention, a machine known in the trade as the Hartford-Empire No. 12 machine, hereinafter called No. 12, which is substantially as illustrated and described in the United States application for Letters Patent, Serial No. 492,407, filed October 1, 1931, by Edward H. Lorenz and George E. Rowe, though it will be obvious that the invention may be applied to other existing machines.

The Hartford-Empire No. 12 Machine

A general description of the No. 12 machine, above mentioned, without reference to the modifications and additions desirably made thereto for the application of the present invention, is as follows:

The machine comprises a pair of horizontal mold tables mounted for continuous rotation about spaced vertical columns, one of said tables (Fig. 2) having a plurality of parison forming units mounted thereon, and the other an equal number of finish or blow mold units (not shown). The mold tables are preferably rotated in opposite directions by suitable driving means, so that companion pairs of parison forming and blowing units are successively moved together in the same general direction toward a transfer zone between the mold tables.

The parison forming units may be substantially identical in construction, as may also the blow mold units, and as at present embodied and shown in the aforesaid application of Lorenz and Rowe, the construction comprises eight parison forming units and a like number of blow mold units.

Each parison forming unit comprises a sectional neck mold, a sectional body mold, and a neck pin arranged to be projected inwardly of the neck mold to form an internal blowing cavity in a charge, and to be afterwards withdrawn.

Each parison forming unit is preferably mounted on the parison mold table for inversion and reversion in a vertical radial plane, and cam controlled mechanism is provided for inverting the unit inwardly of the mold table for the supply of a charge of glass thereto and for the settle blowing of the charge. Such mechanism is arranged to revert the unit outwardly of the table for the counterblowing of the charge into a parison in neck-up position, and for the transfer of the parison in the same position to a companion blow mold unit, and it is capable of adjustment to change the time of inversion and reversion.

Means for positively holding the units in vertical position for relieving strain on the cam controlled mechanism, which inverts and reverts the units, may be provided.

A suitable feeder is preferably provided for supplying charges of glass to the parison forming units and a single guide may be provided for successively directing the charges from the feeder to said units. The guide may have mechanism associated therewith for swinging it with accelerated movement from a position of rest beneath the feeder, where a charge passes into the guide, forwardly in an arcuate path overlying the path of the inverted units a sufficient distance to cause the guide to travel in vertical alignment with a unit as the charge slides through the guide into the molds of the unit and then to return backwardly to the position of rest. In this manner, the guide serves successive units.

The feeding of the charges may take place at a desired point in the rotation of the parison table, but preferably occurs at a point at least 180° prior to the zone of transfer.

The neck molds of the parison forming unit may be opened and closed by cam controlled mechanism which is preferably adjustable. The body molds may be opened by cam controlled mechanism and closed by pneumatic means which supplies the necessary power, but which operates under the control of the cam means. The pneumatic means may hold the body molds closed during and after the inversion of the units and also after reversion while the charges are counterblown.

The neck pin operating mechanism of each parison unit may be arranged to be actuated in response to the inversion of the units to project the neck pin inwardly of the neck mold and in response to the reversion of the units to withdraw the neck pin. Therefore, the time of operation of the neck pin is changed when the invert mechanism is adjusted.

A single settle blow head successively serves to apply settle blow air to the parison units, the operating mechanism therefore being arranged to cause it to travel successively with the units.

The units have valves associated therewith for controlling the supply of counterblowing air and counterblow baffle plates for supporting the charges during the counterblowing thereof. The baffle plates are raised into and held in operative position by pneumatic power operating under the control of cam means which determine the time of such operation, and which also effect the movement of each baffle plate to inoperative position.

Each blow mold unit includes a sectional blow mold and a blow head. Each such unit is mounted for radial movement on its table. Radial movement of such unit is effected by a cam which is also effective to cause the engagement and disengagement of the blow head and the blow mold of the unit and to move the blow mold in a path concentric with the axis of the parison mold table while the mold is closing about a parison suspended from the neck mold of a companion parison unit in effecting the transfer of a parison from a parison unit to its companion blow mold unit. The neck mold may be opened by its cam as or after the blow mold is closed in effecting the transfer. The neck mold cam and the blow mold closing means preferably are arranged for adjustment.

Suitable connections are provided from a source of compressed air through valves certain of which are carried by the tables and actuated by stationary means in the path of movement of the valve actuating means for supplying settle blowing, counterblowing, and final blowing pressure to the glass, and for operating the several pneumatic means above referred to.

In view of the fact that the application of the additional mechanism of the present invention to the said No. 12 machine contemplates no change in the mechanism for feeding and settle blowing the charges of glass in the feed molds, which are substituted for the parison molds in the parison mold holders, nor in the means for opening and closing the several molds, further than slight variations in the timing, and in the transfer of the parison to the blow mold, the detailed mechanism for these features has been largely omitted from the accompanying drawings, and may be considered as identical with those of the aforesaid Lorenz and Rowe applications.

With this understanding, in the accompanying drawings.

In the following particular description, unless otherwise stated, the mechanism is as generally described above, except that the parison table of the No. 12 machine is converted into a feed mold table and the parison molds thereon into feed molds. The distinction to be drawn between a parison mold and a feed mold is that a feed mold preferably contains a cavity of less size than a parison mold for the same ware to be made, and more nearly conforms in its configuration to the shape of the charge being fed. Such a feed mold may readily be substituted in the parison mold holders of the No. 12 machine.

*Feed mold, feed mold operating and feed blank forming mechanism*

Figure 2:
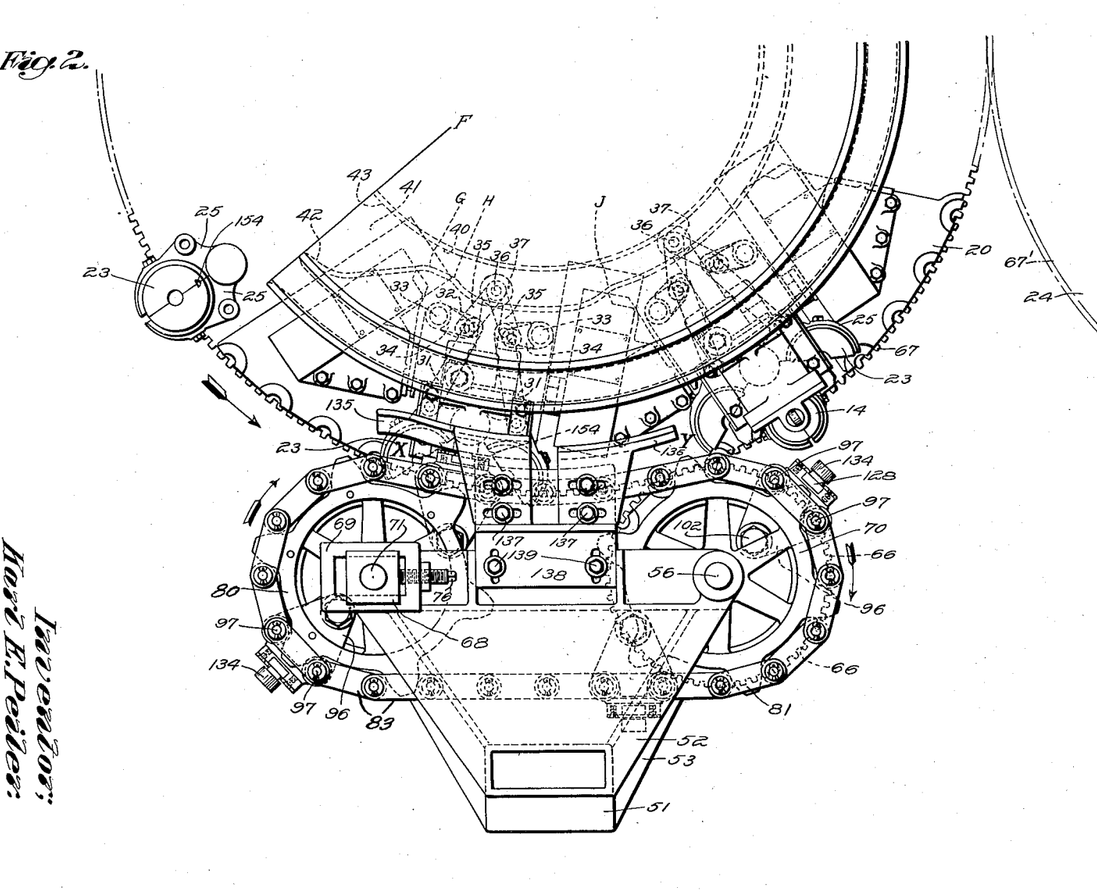
Fig. 2 is a plan view thereof.
Figure 3:
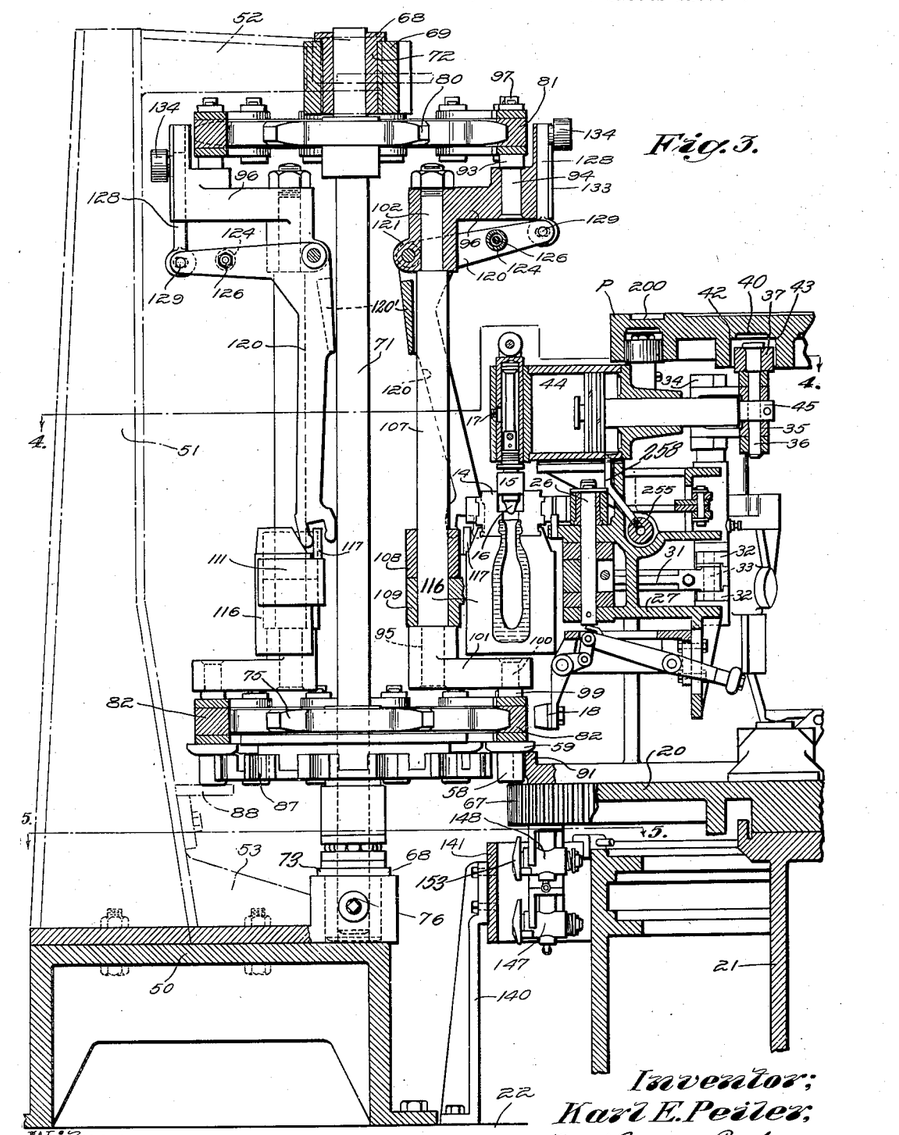
Fig. 3 is a vertical sectional view taken on the line 3—3 of Fig. 4.

Referring particularly to Figs. 2 and 3 of the drawings, a rotatable feed mold table 20 (corresponding to the parison mold table of the No. 12 machine) is shown mounted on a pedestal 21, supported by base 22. The table is adapted to be rotated continuously in a counterclockwise direction, as indicated by the arrow in Fig. 2, through the gears 67, 67'.

The feed mold table 20 carries a plurality of feed mold units corresponding to the parison mold units of the No. 12 machine, but including in lieu of the parison molds of that machine, feed molds 23, each adapted to receive a charge of glassware when in inverted position. Each of the feed molds 23 comprises two halves, each of which is held in a mold holder 25, which mold holders are hinged on a vertical pin 26 mounted in an invertible frame 27.

To each of the mold holders 25 is connected a link member 31, to the other end of each of which is connected a lever 32 mounted on shafts 33, to the upper end of each of which is keyed a lever 34. Each of the levers 34 is connected by a link 35 to a vertical pin 36. One end of the pin 36 carries a cam roller 37 adapted to travel along a cam path 40 in contact with the edge 42 thereof. The molds are closed by air pressure admitted to the inner end of cylinder 44, and are opened by cam edge 42.

Associated with each feed mold 23 is a neck ring 14, a neck pin 16 and a bottom plate 18. A settle blow head (not shown), similar to that of the said No. 12 machine, is provided. Means corresponding to those of the No. 12 machine are provided for opening and closing the feed molds and neck ring at suitable times, projecting the neck pin into the neck ring and withdrawing it therefrom, and for applying the bottom plate 18. Also, suitable valves generally corresponding to those of the No. 12 machine are supplied, together with stationary but adjustable actuating means therefor for applying settle blowing pressure through the bottom of the mold 23, to settle the charge in the neck ring and around the neck pin when the mold is in inverted position, and for applying counterblowing air through the neck ring after the mold has been reverted.

Referring more particularly to Fig 2, it is contemplated that prior to the arrival of each mold at the line F, a charge has been fed to the mold, the charge settle blown, the mold unit reverted by means similar to the No. 12 machine, and if desired, though not necessarily, the charge has been counterblown against the bottom plate 18 to marver the bottom of the charge. This counterblowing operation may, however, be dispensed with if desired for certain types of ware.

Beginning at approximately the line F, Fig. 2, the cam edge 42 begins to act upon the roller 37 to open the feed mold. Beginning at this point, the feed blank suspended from the neck ring begins to reheat. The feed blank is fully opened at the point G, by which time the form mold, hereinafter to be described, may be closing about the suspended blank. As indicated between the points H and J, the cam path is so formed as to permit a partial closing of the feed mold about the then closed form mold, this closing operation being effected by the application of air pressure as hereinafter described to the cylinder 44, to aid in locking the form mold in closed position. Notches 154 are provided in the feed mold halves to grip corresponding projections on the form mold holders. Thereafter, as indicated, the cam path beyond the point J is such that the feed mold is fully opened and remains so until after it passes the transfer zone, which is situated at about the point of tangency of the tables 20 and 24. Thereafter and prior to the arrival of the feed mold again at the feeding station, the mold is closed and the unit inverted as these operations are performed in the No. 12 machine.

The feed mold table is supplied with compressed air for operating the cylinder 44 and for counterblowing and/or form blowing, the said air being admitted to the table through the central column in the conventional way and thence passing by suitable conduits to one side of valve mechanisms, two of which are associated with each feed mold unit.

Figure 5:
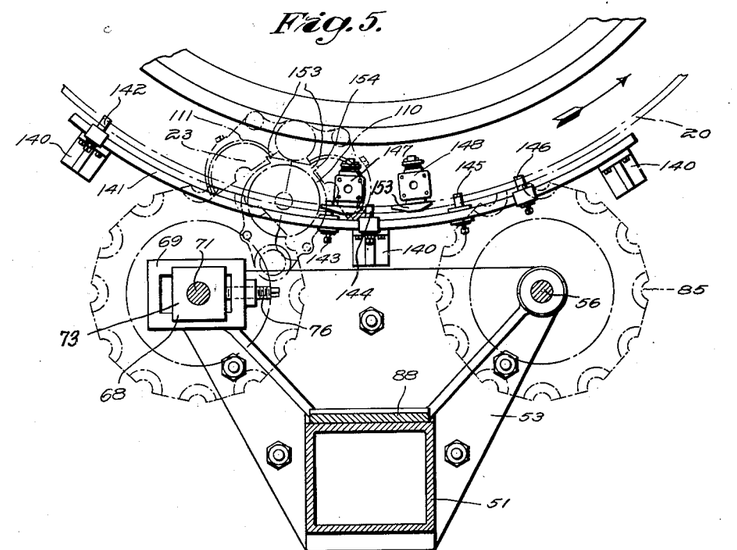
Fig. 5 is a horizontal sectional view taken on the lines 5—5 of Fig. 3.

One valve of each pair, indicated at 148, is mounted on and depends below the table 20 and is preferably of the three-way rotary type, its stem or barrel 152 (Fig. 11) extending beyond its casing and being there provided with the lugs 153 for cooperation with stationary but adjustable tripping members. One side of this valve communicates with a passage in one of the trunnions (not shown) which carry the shaft 255 (Figs. 2 and 11), said passage terminating in a chamber 256, which in turn communicates through a passage 257 in the shaft 255 with the conduit 258 opening into the cylinder 44. The third passage in the valve 148 is arranged to communicate at times with a passage to atmosphere 259. Trip members or dogs 142, 144 and 146 (Fig. 5) designed to operate the valve 148 are adjustably mounted upon a rail 141 and project into the path of the lugs 153 of the valve 148. Three of these dogs or trip members are shown, it being understood, however, that other similar dogs are used at such points adjacent the table as are necessary to close the feed mold after the transfer operation.

The second of the aforementioned pair of valves 147 is similarly mounted below and depending from the table 20, but in a different plane from the valves 148. It may be of the same type as valve 148 designed to alternately connect the neck pin 16 with the source of compressed air and with atmosphere. The valve 147 communicates with the interior of the neck pin by suitable passages through the other of the trunnions, the shaft 255, the passage, and through the pin mechanism. The neck pin is provided with a passage opening toward the feed and/or form mold (see Fig. 11).

Dogs or trip members 143 and 145 (Fig. 5) are also adjustably mounted upon the rail 141 at suitable points to cause the desired operation of the valves 147, as hereinafter more fully explained, to actuate and discontinue the application of air to the glass while it is enclosed by the form mold. It is to be understood that if it is desired to counterblow the glass in the feed mold prior to the transfer thereof to the form mold, two additional dogs of the same character as 143 and 145 will be provided to initiate and discontinue this blowing, which is accomplished through the same blowing mechanism carried by the feed mold table.

As shown, the trip members cooperating with the valve 148 may be mounted on top of the rail 141, being adjustably clamped thereon, while those cooperating with the valve 147 are similarly clamped upon the lower edge of the rail.

The form mold mechanism

A support 50, mounted on the base 22 adjacent to the feed mold table carries a frame 51 having upper and lower arms 52 and 53 respectively extending therefrom. Aligned bearings 54 and 55 in the lower and upper arms respectively of the frame 51 support a vertical shaft 56. To the lower end of the shaft 56 is keyed as at 57 a sprocket wheel 60 having a downwardly extending hub portion 61. The sprocket wheel 60 is fixed on the shaft 56.

Figures 6, 10:
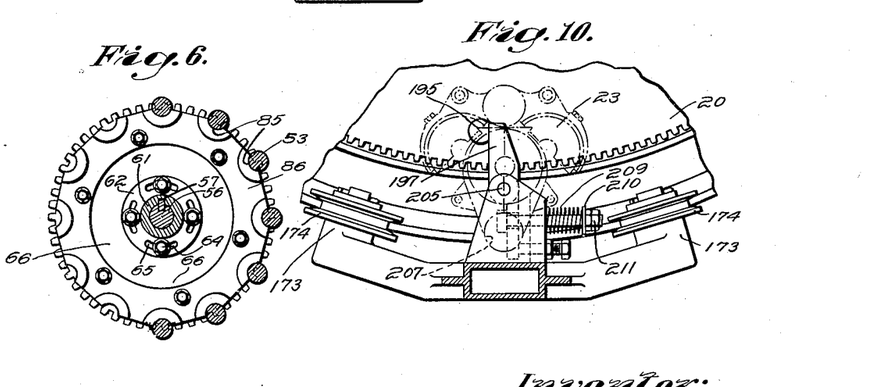
Fig. 6 is a horizontal sectional view taken on the line 6—6 of Fig. 1.
Fig. 10 is a horizontal sectional view taken on the lines 10—10 of Fig. 7.

A gear 66 is adjustably connected to a flange 62 formed on the hub 61 by bolts 64 passing through slots 65 in the flange (Fig. 6). The gear 66 is so positioned that it will mesh with the gear 67 on the feed mold table 20. In a flange on the lower surface of the gear 66 is formed a raceway adapted to cooperate with a raceway in the upper end of the lower arm 53 to contain ball bearings 63 to support the weight of the shaft 56 and the mechanism carried thereby. It will be obvious that while allowing the gear 66 and feed mold table 20 to remain in fixed relationship to each other, the shaft driven by the gear and all the parts carried thereby may be angularly adjusted relative to the gear 66 and the feed mold table by means of the slot and bolt connection 64 and 65.

On the upper end of the shaft 56 immediately below the bearing 55, into which the shaft extends, is mounted an upper sprocket wheel 70 similar to the sprocket wheel 60, preferably so positioned upon the shaft that its teeth are vertically centered over the teeth of the sprocket wheel 60.

A second shaft 71 is mounted parallel to the shaft 56 in upper and lower bearing blocks 72 and 73 respectively. The bearings are identical in construction and each block carries flanges 68 upon which they are supported in a guide 69 (Figs. 2, 3 and 5) formed in each of the arms 52 and 53. The bearing blocks are adjustably positioned in the guides 69 by screws 76. To the lower end of the shaft 71 is keyed at 74 a sprocket wheel 75, located in the same horizontal plane as the sprocket wheel 60. The sprocket wheel 75 is similar in construction to the sprocket wheel 60. Ball bearings are provided in the lower bearing block 73 to carry the thrust of the shaft 71.

Suitably secured to the upper end of the shaft 71 is a sprocket wheel 80, located in the same horizontal plane as the sprocket wheel 70, with its teeth preferably in alignment over the teeth of the sprocket wheel 75. The sprocket wheels 70 and 80 together carry an endless chain 81, and the sprocket wheels 60 and 75 together carry a chain 82, the chains 81 and 82 being of similar length and fabric.

When the mechanism so far described is in operation, the chains 81 and 82 will travel in parallel horizontal paths. It will be obvious that by a single adjustment of the shaft 56 relative to the gear 66, the paths of travel of the chains may simultaneously and in an equal degree be adjusted relative to the gear 66 and to the feed molds 23 and other mechanism carried by the feed mold table 20.

The chains 81 and 82 are composed of a plurality of links 83 and 84 of equal size, held together by pins 78 for chain 82 and pins 97 for chain 81. Each of the pins 78 connecting the links of the lower chain 82 is provided with a downwardly extending portion 58, having a flange 59 thereon. The lower ends 58 of the pins are adapted to fit in notches 85 in a ring 86 bolted to the upper face of the gear 66, in similar notches 87 in a ring 90, attached to the lower surface of the sprocket wheel 75 and into notches 91 formed in the feed mold table 20. The flanges 59 are adapted to bear upon the upper surface of the members in which notches 85, 87 and 91 are formed, and thus prevent the chain from sagging under the weight of mechanism carried thereby. The rings 86 and 90 are so positioned relative to the feed mold table 20 that their notches 85 and 87 at times cooperate with the notches 91 to form, in effect, bearings by which pins 58 are embraced to assure registration of parts hereafter described. A shelf 88 positioned on the frame 51 forms a bearing surface for the ends of the pins 58 and supports the reach of the chain 82 extending between the sprocket wheels 60 and 75 opposite the feed mold table 20.

Figure 1:
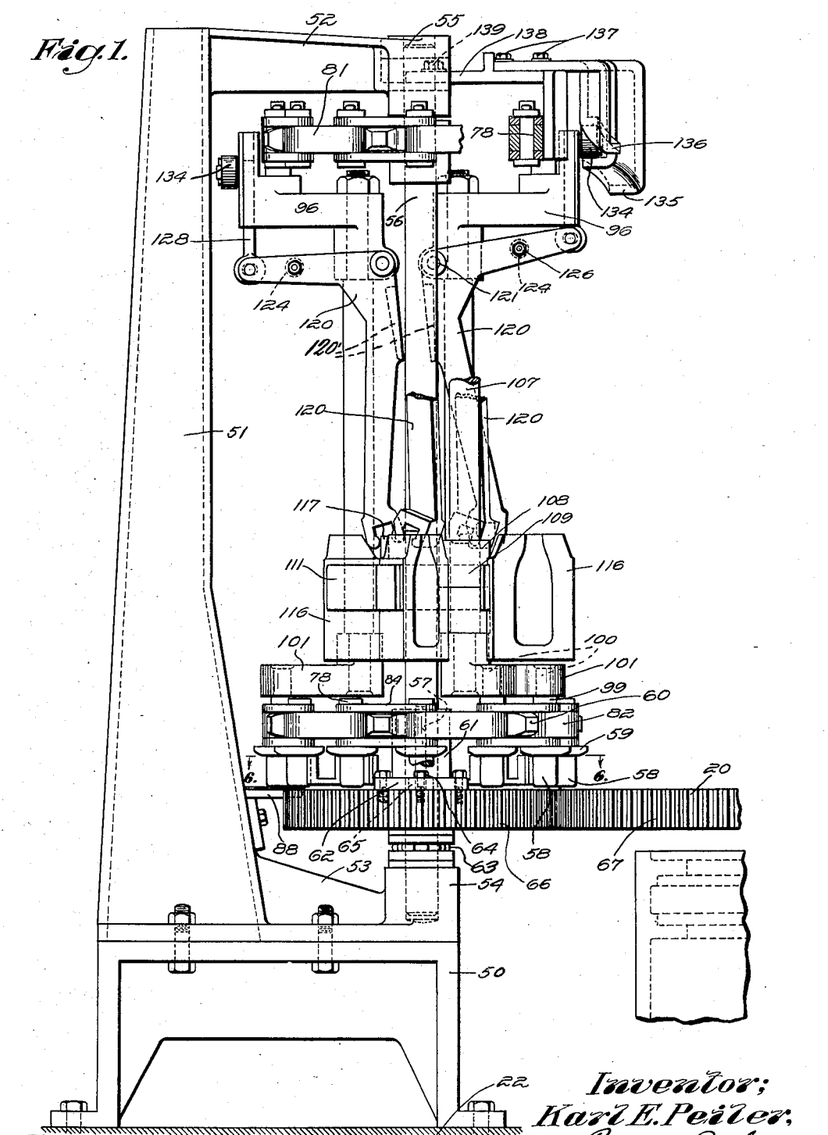
Figure 1 is a side elevation of one embodiment of my invention.
Figure 4:
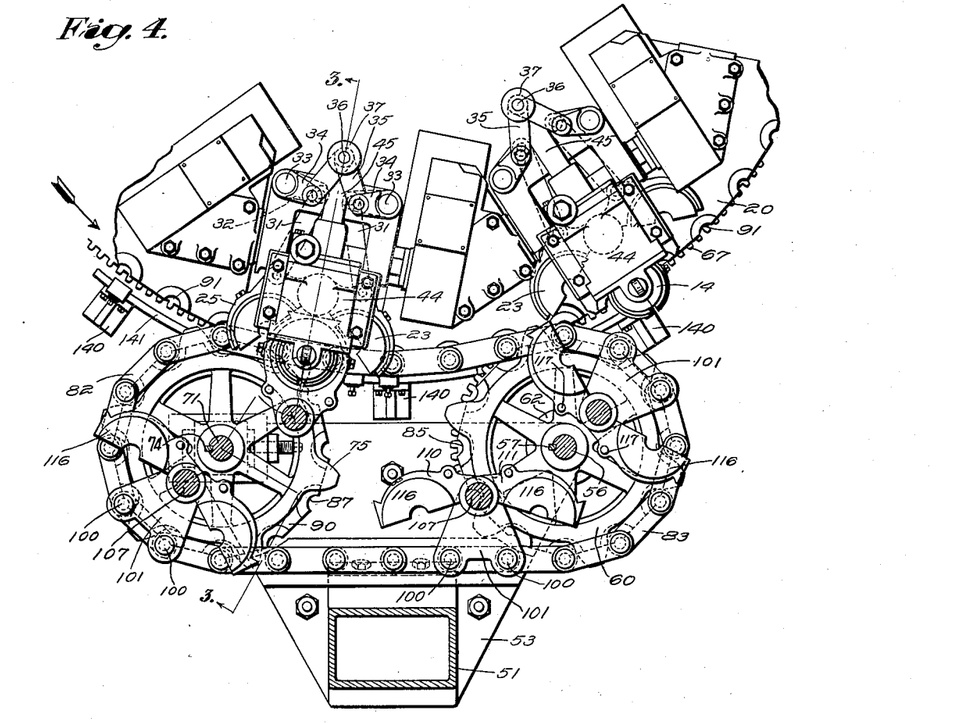
Fig. 4 is a horizontal sectional view taken on the lines 4—4 of Fig. 3.

Pairs of certain adjacent pins 78 (Figs. 1, 3 and 4) extend above the links of the chain 82 and each pair forms a mounting 100 for a plate 101. The plate 101 is supported out of contact with the links of the chain by flanges 99 on the pins. Pairs of certain adjacent pins 97 in the upper chain 81 have downwardly extending portions, each pair forming a support 94 for a plate 96 to which they are rigidly affixed. The plates 96 are spaced from the chain 81 by flanges 93 on the pins 97. Each pair of plates 96 and 101 is rigidly connected by a vertical shaft 107 resting in a socket 95 in the lower plate 101 and extending through a vertically aligned opening 102 in the upper plate 96. Hinged on the shaft 107 as at 108 and 109 are the mold holders 110 and 111, in which the two halves of the form mold 116 are held.

Each form mold may be opened and closed by means of a pair of cam actuated elbow arms 120, as shown most clearly in Fig. 3. Arms 120 of each pair are mounted at their elbows on a horizontal pivot pin 121 in the upper plate 96 for movement past the shaft 107. The arms are connected below their pivot points by a web 120' which may be integral therewith and at their upper end by a bolt 126, passing through a spacing thimble 124. A slide member 128 mounted in a slideway 133 in the plate 96 is pivoted on a cross bolt 129 extending between the extreme upper and outer ends of the two arms 120, the arms being provided with elongate recesses to receive the bolts 129 for accommodating the lost motion. At its upper end, the slide member 128 carries a cam roller 134. The lower ends of the elbow arms 120 are not connected to one another and thus are given a certain amount of spring tension. The lowermost extremities of the arms are formed in the shape of inverted U's and are so positioned that each fits over a pin 117 on one of the form mold holders 110 and 111. It will be apparent that by imparting a vertical movement to the cam roller 134 the form molds may be opened and closed.

Cams 135 and 136 (Figs. 1 and 2) are provided, having respectively upper and lower cam surfaces thereon to form cam paths with which the cam rollers 134 cooperate to open and close the form molds. Each of the cams 135 and 136 is mounted on a plate 138 for adjustment along a path substantially parallel to the path of movement of the form molds, by means of a slot and bolt arrangement indicated at 137. The plate 138 is in turn mounted for adjustment transversely of the path of movement of the form molds on the upper arm 52 of the frame 51 by means of bolts 139 passing through elongate slots in plate 138. The cam surface 135 is so shaped that as the cam rollers 134 move therealong, they will be caused to rise and thus cause the closing of the form molds 116. The cam surface 136 is so shaped that it forces the rollers 134 downwardly to cause the form molds to open. As above pointed out, the cam surfaces may be so positioned that the time of opening and closing of the form mold may be varied as desired. The cams 135 and 136 are so shaped on their faces away from the feed table as to approximate an arc of a circle equal to that of the feed table. These faces contact with and guide the upper chain 81 and cause it to follow a path similar to that of the lower chain 82. The form molds may be formed with integral bottom portions if desired, and are so shown.

In designing a machine, the sprocket wheels, chains, relative position of the form and feed mold tables, and number and position of form molds must be such that as each feed blank held in a neck ring comes to a desired position, a form mold will move into cooperative relation therewith and for a predetermined distance will follow the path of the blank, during which time the blank may be blown to a hollow parison.

Blow mold and cooperating mechanism

Figure 8:
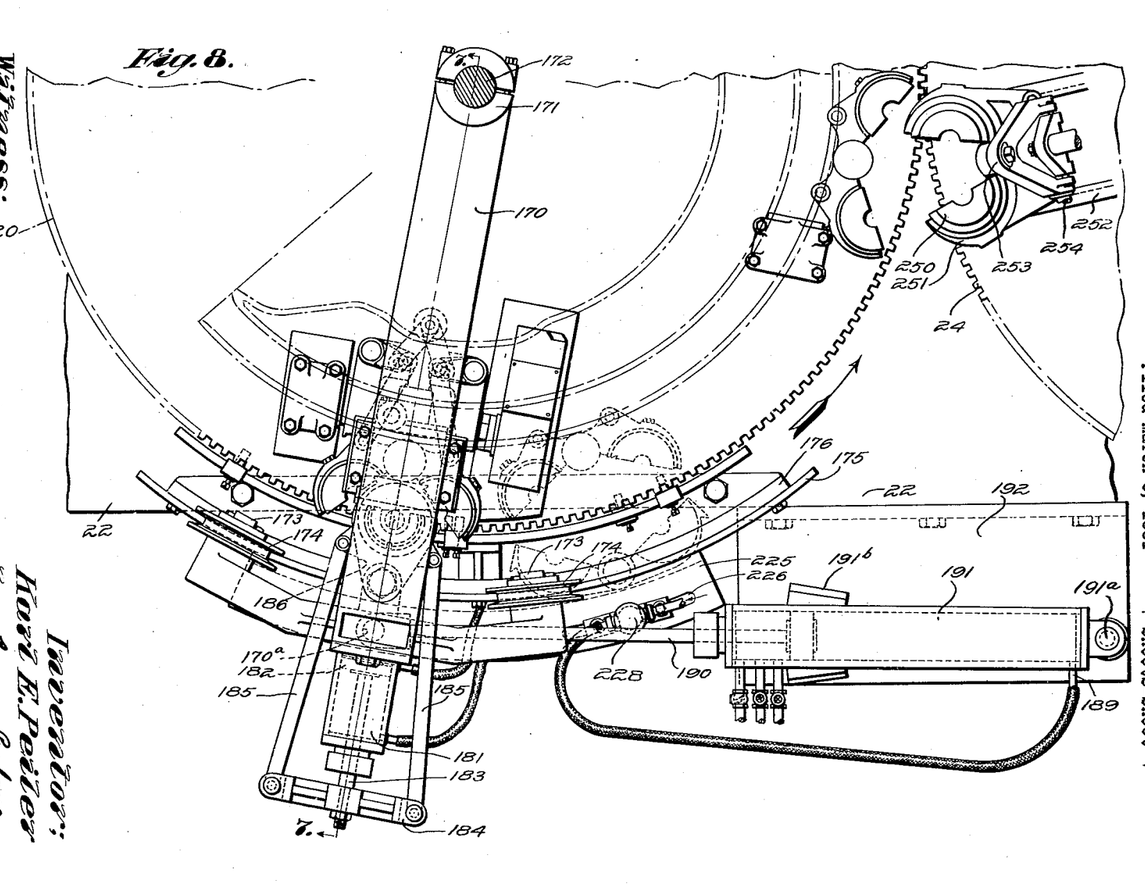
Fig. 8 is a plan view of the embodiment of my invention shown in Fig. 7.

The blow mold table 24, Figs. 2 and 8, carries divided blow molds 250 mounted in holders 251, which in turn are mounted in guideways 252 for movement radially of the blow table, and for cooperation with each of these molds is provided a blow head 253 pivoted as at 254 and so connected with the blow mold and blow mold operating mechanism (not shown) as to be raised and lowered from out of and into contact with the top of the mold by the projection and retraction of the mold radially of its table. Blowing pressure may be applied through the blow heads 253 from a suitable source communicating with the blow head through the column of the blow mold table (not shown), and through valves mounted on the blow mold table, tripped by suitable tripping means in fixed but adjustable position adjacent to the path of movement of said valves. During the period of transfer of a form blown parison to a blow mold, the blow mold is projected by a suitable fixed cam (not shown) so that it will move in a path concentric with the center of the blank mold table 20, and while so travelling the blow mold may be closed about the formed parison suspended from the neck ring, and the neck ring opened to effect the transfer.

The mechanism of the blow mold table may be identical in all respects with the mechanism of the No. 12 machine, and hence it is not shown and described in detail.

In operation, the blow mold approaches the transfer station; transfer is effected at about the point of tangency of the tables 20 and 24; the blow mold with the formed parison therein is then moved inwardly of its table, this movement causing the blow head to descend, and during the time the blow head is in position, blowing air is applied to blow the article to final form and is continued preferably until such time as the bottle is cooled to the desired extent, whereupon the blow mold is opened and the bottle removed by hand or by suitable take-out mechanism.

Operation

One desirable method of operation of the above-described embodiment of my invention is as follows:

Continuous rotary motion is applied to the blow mold table 24 to cause it to rotate continuously in a clockwise direction, which rotation through the gearing 67' and 67 applies to the feed mold table 20 a continuous movement of rotation in a counter-clockwise direction. The feed mold table in turn drives gear 66 to cause the clockwise movement of the form molds. As each feed mold arrives at the feeding station, preferably located a sufficient distance in advance of the line F, Fig. 2, a charge of glass sufficient substantially to fill the feed mold is supplied thereto, the feed mold then being in inverted position and in coacting relation with the neck ring, and the neck pin being projected to the neck ring. Compressed air is then applied to the inverted bottom of the feed mold by the settle blow head, and the charge is forced into the neck ring and around the neck pin to form the finish. Thereafter and prior to its arrival at the point F, the feed mold unit is reverted, and if it is desired to marver the bottom of the feed blank, the bottom plate 18 is applied, the valve 147 is actuated to apply pressure air through the neck pin 16, and after a selected time this valve is again actuated to discontinue such pressure, it being understood that the reversion of the parison unit acts to withdraw the neck pin, as in the No. 12 machine. All of these operations may take place generally in the manner in which they take place in the No. 12 machine, but it is understood that they have been completed when the mold arrives at the line F in Fig. 2.

As the closed feed mold with the feed blank therein arrives at the point F, the cam surface 42 causes an inward movement of the roller 37 and gradually opens the feed mold, the opening operation being complete at about the point G, Fig. 2. From the instant that this opening movement begins, the feed blank begins to reheat, i. e. the heat from the hotter interior glass distributes outwardly and softens the outer skin which has been chilled by the contact with the feed mold. As the feed blank, now suspended from the neck ring, approaches the point X, Fig. 2, a form mold carried upon the chain mechanism described is brought into register and begins its movement in an arc concentric with the neck ring and blank.

At a selected and adjustable time during this movement, determined by the position of the cam 135, the form mold closes about the suspended blank and neck ring and thereafter the feed mold halves are closed upon the form mold by the timed admission of air to the cylinder 44. This locks the form mold against opening under the counterblowing pressure which is thereafter applied to blow the feed blank into a parison of the shape determined by the internal cavity of the form mold. The time of application and duration of form blowing pressure is adjustable through the adjustability of the dogs cooperating with valve 147. The form mold may travel in register with the parison to approximately the point Y. At a selected time after the form blowing has been discontinued, the form mold may be partially or fully open to permit a reheat of the formed parison, the time of such opening being adjustable through the adjustment provided for the cam 136 and of the dogs for operating valve 148.

The form mold may be opened either by releasing air pressure in the cylinder 144 and then bringing the roller 134 into contact with a suitably shaped cam 136 to first crack the mold and thereafter to fully open it, the feed mold in the meantime being fully opened by the cam 142; or the cam 142 may act first to fully open the feed mold and then the cam 136 may act to open the form mold.

After the opening of the form mold, the form blown parison suspended from the neck ring and reheating is carried to the transfer zone, at which the cooperating blow mold 250 is projected radially of its table and caused to follow a path concentric with the feed mold table while closing about the suspended parison, during which period the blow mold is travelling in an arc concentric with the feed mold table. The neck ring is opened whereupon the blow mold is retracted inwardly of its table, thus causing the blow head 253 to descend. At a suitable time after the descent of the blow head, the valve controlling pressure to that head is operated to apply pressure for finally blowing the glass in the blow mold, this time of actuation being adjustable by means of adjustable dogs similar to those heretofore described in connection with the feed mold table.

Meanwhile the feed mold continues to travel with its chain, being suitably cooled or heated to prepare it for the operation with a succeeding feed blank.

From the foregoing description, it is obvious that in the use of the embodiment of my invention above described, a suitable period of reheat is provided between the completion of the feed blank formation and the form blowing, and between the form blowing and the final blowing, and these periods may be properly selected to best suit the type of ware being made by suitably positioning the various adjustable means above mentioned.

In order to obtain the best results in the operation of my novel mechanism, it is recommended that the contour of the cavity of the feed mold and the weight of the feed mold be carefully selected to suit the shape of the charge to be fed therein and to assure the desired abstraction of heat from that charge during the period available, and that the cavities of the form molds be selected to sufficiently approach in shape the cavities of the blow mold to assure a uniformity of expansion of all parts of the glass during the final blowing. The proper selection of relationship of the mold cavities and the weights of the molds is of great importance to efficient production.

Modified form of invention

Another embodiment of my invention is shown in Figs. 7, 8, 9, 10 and 12, in which the parts on the feed mold table and blow mold table are identical with those shown in the first embodiment of my invention. The differences in the two structures, illustrated respectively in Figs. 1 etc. and 7 etc., reside in the type of the form mold mounting and actuating mechanism and the means for effecting the timing thereof.

Figures 7, 11, 12, 13:
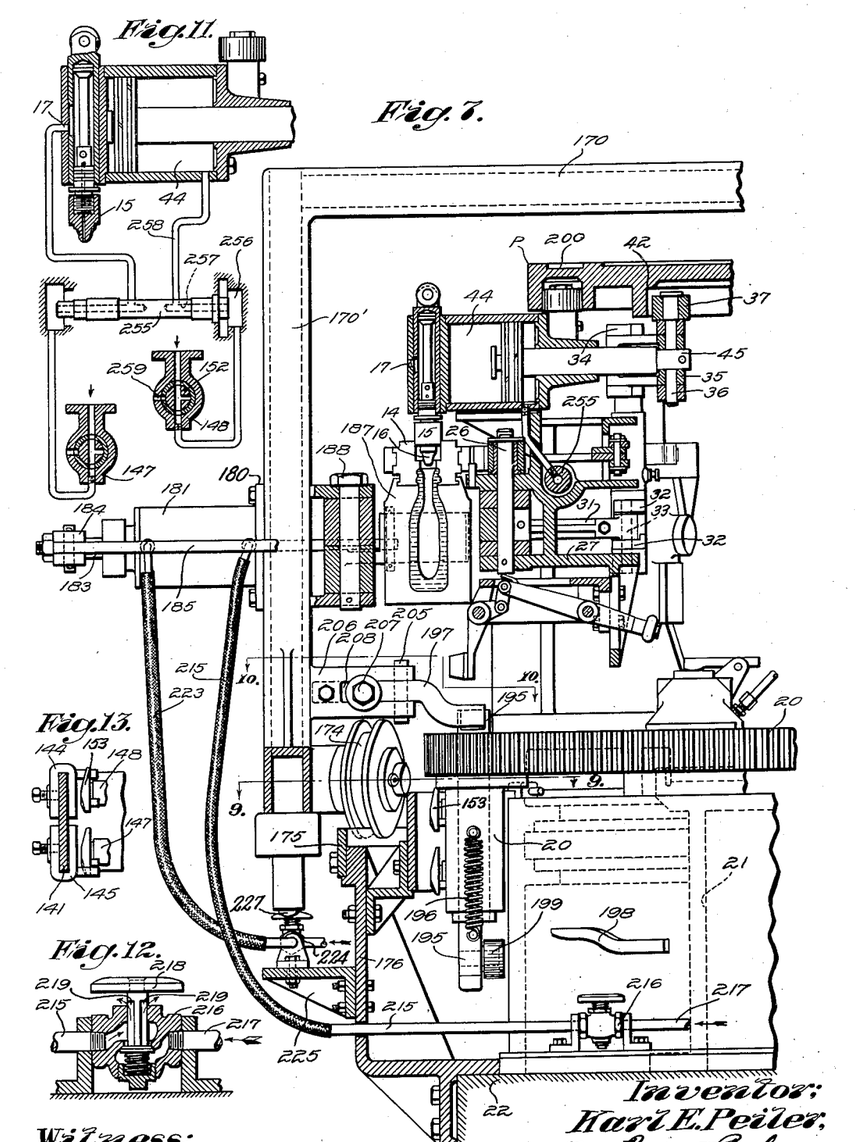
Fig. 7 is a vertical sectional view of another embodiment of my invention taken on the line 7—7 of Fig. 8.
Fig. 11 is an air line diagram of the timing means of both embodiments of my invention.
Fig. 12 is a detail sectional view of an air valve used in connection with the embodiment of my invention shown in Fig. 7.
Fig. 13 is a vertical section showing the manner in which the valves illustrated in Fig. 11 are actuated.

In Figs. 7 and 8, a single form mold is shown mounted for oscillatory movement about the column of the feed mold table 20. An inverted L-shaped frame 170 is mounted, by a split bearing 171 formed at the end of the horizontal leg, on the column 172 of the feed table. The vertical leg 170' of the frame depends beyond the periphery of the feed mold table and near its lower end carries a horizontal bracket bearing a pair of shafts 173 on which are mounted flanged wheels 174 adapted to travel on a rail 175 mounted on a bracket 176 attached to the base 22 of the feed mold table. Thus the frame 170 is supported at its lower end by the rail 175 and at its upper end by the column 172 of the feed mold table.

The frame 170 carries a bracket 180 to which is attached an air cylinder 181 having a piston 182 therein to which is connected a piston rod 183. A cross member 184 is connected with the outer end of the piston rod 183, the ends of which are connected by links 185 to mold holder halves 186 of a form mold 187. The mold holder halves are pivoted on a pin 188 mounted in the bracket 180. By the admission and exhaust of air to and from the ends of the cylinder 181, the form mold may be opened and closed. The outer end of the cylinder 181 is alternately connected to a source of compressed air and to atmosphere by a flexible conduit through valve 224, and the inner end of the cylinder is similarly connected through valve 216, as hereinafter explained.

The frame 170 is pivotally connected as at 170$^a$ to a piston rod 190 of an air motor 191. The air motor is pivoted as at 191$^a$ on the bracket 192 attached to the base 22 of the feed mold table. One end of the motor 191 is mounted over a guide 191$^b$. Admission of air to the outer end of the cylinder 191 through a port 189 will move the frame 170 and the parts carried thereby in an arc concentric with the path of movement of said mold 20, and the air motor 191 and its piston 190 will swing about the pivots 170$^a$ and 191$^a$ to conform to the oscillating movement of the frame 170.

The piston rod and cylinder 190 and 191 are mounted so that the path of movement of the piston rod is substantially perpendicular to the radial center line of the frame 170, whereby the admission of air to the outer end of the cylinder 191 through the port 189 will move the frame 170 and the parts carried thereby in an arc concentric with the path of movement of the feed mold table 20, and in a direction opposite to that of the movement of the table to return the mold after each forming operation has been completed.

The frame 170 is moved with the feed mold table by the following cooperating mechanism. Mounted for sliding movement through the feed mold table 20 and depending guide members 20' are vertically sliding rods 195, one of which is associated with each feed mold unit and all of which are urged upwardly by springs 196 and are so positioned that they will, when in their uppermost positions, come successively into contact with an arm 197 carried by the frame 170. When a rod 195 comes into contact with the arm 197, the frame 170 is moved in synchronism with the feed mold table 20 through the desired arc. In order to allow the return of the frame to position for cooperation with a succeeding feed mold unit, the rod 195 is withdrawn from contact with the arm 197 by a cam 198 mounted beneath the feed mold table 20, so positioned that it will cooperate with a cam roller 199 mounted on the lower end of the rod 195, to force the rod downwardly and out of contact with the arm 197.

The arm 197 is pivoted intermediate its ends on a pin 205 carried by a bifurcated bracket 206 on the frame 170. Through the end of the arm 197 away from the feed table is passed a bolt 207 carrying a compression spring between a nut on a rearwardly extending portion of the bolt and the bracket 206. Thus when the rod 195 comes in contact with the arm 197, the shock of the contact is broken by the spring 209 and is not imparted to the frame 170 and the mechanism carried thereby.

Air is admitted to the inner end of the cylinder 181 to open the form mold halves through a line 215 which runs to a valve 216 mounted on the base 22 of the feed mold table. A detailed construction of the valve is shown in Fig. 12. It will be obvious therefrom that by applying mechanical pressure to the head 218 of the valve stem and thus forcing it downwardly, air pressure coming from the source through pipe 217 will pass upwardly through the valve casing and out through the line 215, and that upon the removal of the mechanical pressure from the valve head 218 air pressure will be exhausted from the line 215 and will pass to the atmosphere through ports 219, as indicated by the arrows. The vertical rod 195 forms means for depressing the valve 216 and the valve is so arranged relative to the rod that before the rod has been so lowered by the cam 198 as to free the form mold 187 and the frame 170 from the motion imparted to it by the table, the valve will be depressed and the form mold halves opened.

Figure 9:
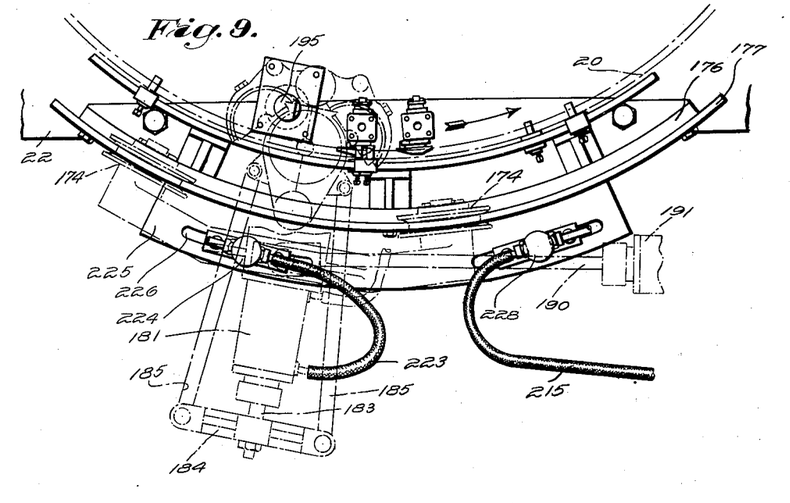
Fig. 9 is a horizontal sectional view taken on the lines 9—9 of Fig. 7.

The form mold 187 is closed by admitting air pressure to the outer end of the cylinder 181 through a pipe 223 connected to a valve 224 similar in construction to the valve 216. This valve is adjustably mounted over a slot 226 in a shelf 225 on the bracket 176 (Figs. 7 and 9). The valve is actuated by a dog 227 carried on the lower end of the frame 170. A third valve 228 similarly like the valve 216 is also adjustably mounted on the shelf 225. This valve is connected to the outer end of the air cylinder 191 to return the frame and the form mold carried thereby to its first position for cooperation with a succeeding feed mold. The valve 228 is also actuated by the dog 227, but at almost the end of the movement of the frame 170 with the feed mold table, as will be obvious from a consideration of Figs. 8 and 9.

The feed molds may be opened and closed and air for form blowing supplied at predeterminably variable times, as pointed out in the description of the first embodiment of my invention.

The cams 198 and valve 216 may be mounted for adjustment in a manner similar to valves 224 and 228. Thus the times of opening and closing of the form mold may be varied. As described in connection with the first form of the invention, the times of initiation and discontinuation of the form blowing may be also varied. Thus the reheat times, both before and after the form blowing or either of them, may be varied as desired.

The operation of the modified form of the invention is obvious from what has heretofore been said. In this form, form molds may be locked closed by the feed molds as described in connection with the first embodiment, or the locking feature may be omitted, the pressure in cylinder 181 being relied on to oppose pressures applied interiorly of the mold.

Numerous modifications and changes may be made from the above-described illustrative embodiments of my invention without departing from the spirit and the scope of the invention as set forth in the following claims.

I claim:

1. Apparatus for forming glassware, comprising a feed mold mounted for continuous rotary movement, a neck ring travelling therewith, a form mold, means to move said form mold in coincidence with said neck ring through a predetermined portion of its path, a blow mold, means to transfer a glass parison shaped in said form mold to said blow mold, and means to expand the parison to final form in said blow mold.

2. Apparatus for forming glassware, comprising a feed mold mounted for rotary movement, a neck ring travelling therewith, a form mold, means to move said form mold in coincidence with said neck ring through a predeterminably adjustable portion of its path, a blow mold, means to transfer a glass parison shaped in said form mold to said blow mold, and means to expand the parison to final form in said blow mold.

3. Apparatus for forming glassware, comprising a feed mold mounted for movement in a closed path, a neck ring associated with said feed mold, a form mold, means to move said form mold in coincidence with said neck ring through a predetermined portion of its path, means for adjusting the relationship of the path of travel of the form mold to the path of travel of the neck ring to predetermine at least one of the limits of the coincidence of the path of the form mold and neck ring and thereby for adjustably determining the length of such coincident path, a blow mold, means to transfer a glass parison shaped in said form mold to said blow mold, and means to expand the parison to final form in said blow mold.

4. Apparatus for forming hollow blown glassware, comprising a neck ring adapted for continuous rotation about a vertical axis, a feed mold adapted to close about said neck ring, means for opening and closing said feed mold, means for adjusting the time of opening of said feed mold, a form mold, means for moving said form mold, means for causing said form mold to travel in a path coincident with a portion of the path of travel of said neck ring, means for closing said form mold during the time its path of travel coincides with that of said neck ring, means for applying pressure through said neck ring to expand a charge of glass to the shape of said form mold when said neck ring and form mold are traveling in coincidence, a blow mold, means to transfer a glass parison shaped in said form mold to said blow mold, and means to expand the parison to final form in said blow mold.

5. Apparatus for forming hollow blown glassware, comprising a neck ring adapted for rotation about a vertical axis, a form mold, means for moving said form mold, means for causing said form mold to travel in a path coincident with a portion of the path of travel of said neck ring, means for closing said form mold during the time its path of travel coincides with that of said neck ring, means for applying pressure through said neck ring to expand a charge of glass to the shape of said form mold when said neck ring and form mold are traveling in coincidence, means for opening said form mold during the coincidence of its path of travel with that of the neck ring, a blow mold, means to transfer a glass parison shaped in said form mold to said blow mold, and means to expand the parison to final form in said blow mold.

6. Apparatus for forming hollow glassware, comprising a neck ring, means for moving the neck ring, a feed mold adapted to close in cooperative relation with said neck ring, means to open said feed mold, a form mold, means to close said form mold in register with said neck ring while the latter is moving, means to adjust the time of opening of said feed mold and the time of closing of said form mold to adjust the time during which said neck ring is in cooperation with either mold, a blow mold, means to transfer a glass parison shaped in said form mold to said blow mold, and means to expand the parison to final form in said blow mold.

7. Apparatus for forming hollow glassware which comprises a feed mold, means for forming a feed blank therein, means to open and close said feed mold, a form mold, means to close the form mold about a blank formed in the feed mold, means to apply pressure within said form mold to expand the feed blank, and means including said feed mold for holding said form mold closed against said pressure.

8. Apparatus for forming hollow glassware, comprising a rotatable feed mold table, an endless chain, form molds carried by said chain, and means including said feed mold table to hold said chain in a predetermined horizontal path, during a part of which the form molds are moved in a path concentric with the feed mold table.

9. Apparatus for forming hollow glassware, comprising a feed mold table, a moving neck ring thereon, an endless chain, means for moving the chain, a form mold thereon, means including said feed mold table for maintaining said endless chain in a predetermined path, whereby said form mold may be maintained in a predetermined position relative to said neck ring while the neck ring and form mold are moving.

10. Apparatus for forming hollow glassware, comprising a feed mold table, a plurality of neck rings thereon adapted for continuous movement in a closed path, a plurality of form molds, means for moving successive form molds into axial alignment with successive neck rings, blow molds, automatic means to transfer glass parisons shaped in said form molds to said blow molds, and means to expand the parisons to final form in said blow molds.

11. Apparatus for forming hollow glassware, comprising a feed mold table adapted for continuous rotation, a plurality of feed molds thereon, a neck ring associated with each feed mold, a plurality of form molds adapted to travel in a path in which each form mold is for a time in axial alignment with one of said neck rings, means to close each of said form molds into cooperative relation with one of said neck rings, and means including a feed mold to maintain each of said form molds in a predetermined position relative to the neck ring with which it is in cooperative relation.

12. Apparatus for forming hollow glassware, comprising a rotatable feed mold table, a plurality of neck rings thereon, a form mold support, a plurality of form molds mounted on said support for continuous movement, means to open and close said form molds, means for moving the feed mold table and the form mold support synchronously, means for actuating the form mold opening and closing means during such movement, blow molds, automatic means to transfer glass parisons shaped in said form molds to said blow molds, and means to expand the parisons to final form in said blow molds.

13. In apparatus for forming glassware, a rotatable feed mold table, a plurality of circumferentially spaced feed molds thereon, a frame mounted for oscillation about an axis coincident with that of said feed mold table, a form mold carried by said frame, and means to move said form mold in a path coincident in part with the path of travel of said feed mold.

14. In apparatus for forming glassware, a rotatable feed mold table, a plurality of neck rings thereon, a form mold mounted for oscillating movement over a portion of the path of travel of said neck ring, and means actuated by movement of said feed mold table for moving said form mold in one direction over said path.

15. In apparatus for forming glassware, a rotatable feed mold table, a plurality of neck rings thereon, a form mold mounted for oscillating movement over a portion of the path of travel of said neck ring, means controlled by movement of said feed mold table for moving said form mold in said path, and means controlled by movement of said table for opening and closing said mold from and to cooperative relation with said neck ring.

16. In apparatus for forming glassware, a rotatable feed mold table, a plurality of neck rings thereon, a form mold mounted for oscillating movement over a portion of the path of travel of said neck ring, means controlled by movement of said feed mold table for moving said form mold in said path, and means actuated by the movement of said last-named means to cause the repositioning of said form mold for movement with a succeeding neck ring.

17. Apparatus for forming hollow glassware comprising a rotatable feed mold table, a plurality of feed molds thereon, a neck ring associated with each feed mold, means to close said feed mold about said neck ring, means for forming a feed blank with neck finish thereon in said feed mold and associated neck ring, means for opening said feed mold, a movable form mold, means for closing said form mold about said neck ring while said neck ring is moving, means for blowing a form blank in said form mold, means for opening said form mold, a final blow mold, means for transferring said form blank to said blow mold, and means for blowing said form blank to final shape in said blow mold.

18. Apparatus for forming hollow glassware, comprising a feed mold carrier mounted for rotation about a vertical axis, a blow mold carrier also mounted for rotation about a vertical axis, means to rotate said carriers, a cooperable neck ring and feed mold on said feed mold carrier, independent means for opening and closing said feed mold and neck ring, means for forming a feed blank in said feed mold and neck ring, a form mold mounted for movement in a path at least a portion of which is concentric with the axis of said feed mold carrier and cooperable with said neck ring during at least a portion of its concentric travel, means to close said form mold about a feed blank suspended from said neck ring during the concentric travel thereof, means to supply pressure through said neck ring to expand the feed blank to the shape of said form mold and thereby to form a parison, means to open said form mold leaving the formed parison suspended from said neck ring, a blow mold on said blow mold carrier, automatic means to transfer the parison so formed and suspended to said blow mold, and means to blow said parison to final form in said blow mold.

19. Apparatus for forming hollow glassware, comprising a feed mold carrier mounted for rotation about a vertical axis, a blow mold carrier also mounted for rotation about a vertical axis, means to rotate said carriers, a cooperable neck ring and feed mold on said feed mold carrier, independent means for opening and closing said feed mold and neck ring, means for forming a feed blank in said feed mold and neck ring, a form mold mounted for movement in a path at least a portion of which is concentric with the axis of said feed mold carrier and cooperable with said neck ring during at least a portion of its concentric travel, means to close said form mold about a feed blank suspended from said neck ring during the concentric travel thereof, means to supply pressure through said neck ring to expand the feed blank to the shape of said form mold and thereby to form a parison, means to open said form mold leaving the formed parison suspended from said neck ring, a blow mold on said blow mold carrier, automatic means to transfer the parison so formed and suspended to said blow mold, means to blow said parison to final form in said blow mold, and independently adjustable means for determining the duration of the times of contact of the glass and each of said molds.

20. Apparatus for forming hollow glassware, comprising a feed mold carrier mounted for rotation about a vertical axis, a blow mold carrier also mounted for rotation about a vertical axis, means to rotate said carriers, a cooperable neck ring and feed mold on said feed mold carrier, independent means for opening and closing said feed mold and neck ring, means for forming a feed blank in said feed mold and neck ring, a form mold mounted for movement in a path at least a portion of which is concentric with the axis of said feed mold carrier and cooperable with said neck ring during at least a portion of its concentric travel, means to close said form mold about a feed blank suspended from said neck ring during the concentric travel thereof, means to supply pressure through said neck ring to expand the feed blank to the shape of said form mold and thereby to form a parison, means to open said form mold leaving the formed parison suspended from said neck ring, a blow mold on said blow mold carrier, automatic means to transfer the parison so formed and suspended to said blow mold, means to blow said parison to final form in said blow mold, independently adjustable means for determining the duration of the times of contact of the glass and each of said molds, and independently adjustable means for determining the time the feed blank is out of contact with any body mold intermediate the contact of the glass with the feed mold and form mold and for determining the time the formed parison is out of contact with any body mold intermediate the contact of the glass with the form mold and blow mold.

21. Apparatus for forming hollow glassware, comprising a neck ring, a partible body mold cooperable therewith for imparting a preliminary configuration to a charge of glass supplied thereto, means for opening and closing said partible body mold effective while said neck ring remains closed, a secondary partible body mold also cooperable with said neck ring for imparting a secondary configuration to the glass preliminarily formed in the first named mold, means for supplying fluid pressure through said neck ring to expand the glass to conformity with the interior cavity of said secondary mold, means to open and close said secondary mold, and means to retain said secondary mold closed during the application of pressure to expand the glass therein, the last named means including the first named mold and its opening and closing means and interengaging portions on said molds.

22. Apparatus for forming hollow glassware, comprising a feed mold carrier mounted for rotation about a vertical axis, a blow mold carrier mounted for rotation about a vertical axis eccentric of the axis of said feed mold carrier, means to rotate said carriers continuously, a cooperable neck ring and feed mold mounted on said feed mold carrier to open and close about a common pivot, independent means for opening and closing said feed mold and neck ring, means for forming a feed blank in said feed mold and neck ring, a form mold mounted for movement in a path at least a portion of which is concentric with the axis of said feed mold carrier and cooperable with said neck ring during at least a portion of its concentric travel, means operable by and as a result of the rotation of said feed mold carrier for moving said form mold during its concentric travel at the same speed as and in registry with said neck ring, means to close said form mold about a feed blank suspended from said neck ring during the concentric travel thereof, means to supply fluid pressure through said neck ring to expand the feed blank to the shape of said form mold and thereby to form a parison, means operable thereafter to open said form mold leaving the formed parison suspended from said neck ring, a blow mold on said blow mold carrier, means for automatically transferring the parison so formed and suspended to said blow mold, and means to blow said parison to final form in said blow mold.

23. Apparatus for forming hollow glassware, comprising a feed mold carrier mounted for rotation about a vertical axis, a blow mold carrier also mounted for rotation about a vertical axis, means to rotate said carriers, a cooperable neck ring and feed mold on said feed mold carrier, independent means for opening and closing said feed mold and neck ring, means for forming a feed blank in said feed mold and neck ring, a form mold mounted for movement in a path at least a portion of which is concentric with the axis of said feed mold carrier and cooperable with said neck ring during at least a portion of its concentric travel, means at least a part of which travel with said form mold to close said form mold at a predetermined adjustable position in its concentric travel and to open said form mold at another predetermined adjustable position in its concentric travel, means to supply fluid pressure through said neck ring to expand the feed blank to the shape of said form mold during at least a part of the time it is closed and thereby to form a parison, a blow mold on said blow mold carrier, automatic means to transfer the parison so formed to said blow mold, and means to blow the parison to final form in said blow mold.

24. Apparatus for forming hollow glassware, comprising a feed mold carrier mounted for rotation about a vertical axis, a blow mold carrier also mounted for rotation about a vertical axis, means to rotate said carriers, a cooperable neck ring and feed mold on said feed mold carrier, means for opening and closing said feed mold and said neck ring, means for forming a feed blank in said feed mold and neck ring, an endless flexible carrier mounted for movement in a path adjacent to said feed mold carrier a portion of which path is concentric with the axis of rotation of said feed mold carrier, sprockets about which said flexible carrier passes, a form mold mounted on said flexible carrier and moved thereby in an orbital path a portion of which is concentric with the said feed mold carrier, said form mold being cooperable with said neck ring during at least a portion of their concentric paths of movement, means for driving one of said sprockets in timed relation with the rotation of said feed mold carrier, means for adjustably determining the position of said feed mold with respect to the drive means for the driven sprocket about which its flexible carrier passes and for thereby effecting registration between said form mold and said neck ring, means to close said form mold about a feed blank while it is suspended from said neck ring and during the concentric travel of said form mold and neck ring, means to supply fluid pressure through said neck ring to expand the blank to the shape of said form mold and thereby to form a parison, means to open said form mold leaving the formed parison suspended from said neck ring, a blow mold on said blow mold carrier, automatic means to transfer the parison so formed and suspended to said blow mold, and means to blow said parison to final form in said blow mold.

25. Apparatus for forming hollow glassware, comprising a feed mold carrier mounted for rotation about a vertical axis, a blow mold carrier also mounted for rotation about a vertical axis, means to rotate said carriers, a cooperable neck ring and feed mold on said feed mold carrier, independent means for opening and closing said feed mold and neck ring, means for forming a feed blank in said feed mold and neck ring, a flexible conveyor mounted for movement adjacent to said feed mold carrier in a path a portion of which is concentric with said feed mold carrier, means to support said flexible carrier for movement in said path, means for moving said flexible carrier in said path in synchronized time relation to the rotation of said feed mold carrier, a partible form mold mounted on said flexible carrier and adapted to be moved thereby along a path having a portion concentric with the axis of rotation of said feed carrier, means for opening and closing said form mold including a fixed cam and a follower for said cam which is movable in a direction perpendicular to a plane including the path of said flexible carrier, whereby the form mold may be maintained for a material time in cooperative relation with said neck ring during the travel of said neck ring and said form mold, means for supplying fluid pressure through said neck ring to expand a feed blank formed in said neck ring and said feed mold to the shape of said form mold when the neck ring and form mold are closed and traveling in registration and thereby to form a parison, a blow mold on said blow mold carrier, automatic means to transfer the parison so formed to said blow mold, and means to blow said parison to final form in said blow mold.

26. Apparatus for forming hollow glassware, comprising a feed mold carrier mounted for rotation about a vertical axis, a blow mold carrier also mounted for rotation about a vertical axis, means to rotate said carriers continuously, a cooperable neck ring and feed mold mounted on said feed mold carrier, independent means for opening and closing said feed mold and neck ring, means for forming a feed blank in said feed mold and neck ring, a pair of vertical shafts mounted adjacent to said feed mold carrier each having upper and lower horizontally aligned sprocket wheels thereon, flexible sprocket chains passing about the upper and lower sprocket wheels on said shafts, means to drive one of said shafts in synchronism with said feed mold carrier, a support connected to the upper and lower sprocket chains, a form mold on said support, means to cause one reach of each of said sprocket chains to move in paths concentric with said feed mold carrier, whereby said form mold may be moved in registry and cooperate with said neck ring while the latter is traveling at a constant angular velocity about the axis of said feed mold carrier, means to close said form mold about a feed blank suspended from said neck ring during the concentric travel thereof, means to supply pressure through said neck ring to expand the feed blank to the shape of said form mold and thereby form a hollow parison, means to open said form mold leaving the formed parison suspended from said neck ring, a blow mold on said blow mold carrier, automatic means to transfer the parison so formed and suspended to said blow mold, and means to blow the parison to final form in said blow mold.

27. Apparatus for forming hollow glassware, comprising a mold carrier mounted for rotation about a vertical axis, means to rotate said carrier, a plurality of neck molds and cooperable preliminary body molds on said carrier, independent means for opening and closing said neck molds and for bringing said body molds into and out of cooperation with said neck molds, means to form a glass blank in each of said neck molds and cooperating preliminary body molds, a carrier mounted for oscillation about said vertical axis, a secondary body mold on the last named carrier adapted to be closed into cooperative relation with each of said neck molds in succession, means to oscillate said last named carrier to cause said secondary mold to move in registry with each of said neck molds successively, means to open and close said secondary body mold, and means to supply fluid pressure through each of said neck rings successively to expand blanks of glass to conformity with the interior cavity of said secondary mold when it is closed into cooperative relation with one of said neck molds.

28. Apparatus for forming hollow glassware, comprising a mold carrier mounted for rotation about a vertical axis, means to rotate said carrier, a plurality of neck molds and cooperable preliminary body molds on said carrier, independent means for opening and closing said neck molds and for bringing said body molds into and out of cooperation with said neck molds, means to form a glass blank in each of said neck molds and cooperating preliminary body molds, a carrier mounted for oscillation about said vertical axis, a secondary body mold on the last named carrier adapted to be closed into cooperative relation with each of said neck molds in succession, means to oscillate said last named carrier to cause said secondary mold to move in registry with each of said neck molds successively, means for adjustably determining the amplitude of oscillation of said last named carrier, means to open and close said secondary mold, and means to supply fluid pressure through each of said neck rings successively to expand blanks of glass to conformity with the interior cavity of said secondary mold when it is closed into cooperative relation with one of said neck molds.

29. Apparatus for forming hollow glassware, comprising a mold carrier mounted for rotation about a vertical axis, means to rotate said carrier, a plurality of neck molds and cooperable preliminary body molds on said carrier, independent means for opening and closing said neck molds and for bringing said body molds into and out of cooperation with said neck molds, means to form a glass blank in each of said neck molds and cooperating preliminary body molds, a carrier mounted for oscillation about said vertical axis, a secondary body mold on the last named carrier adapted to be closed into cooperative relation with each of said neck molds in succession, means for oscillating the last named carrier including resilient means interposed between the two named carriers for moving said last named carrier in the same direction and angular velocity as the first named carrier and means subject to the completion of the movement of the oscillatory carrier in the same direction as the first named carrier for resiliently returning the oscillatory carrier to its initial position, and means to supply fluid pressure through each neck mold during its time of cooperation with said secondary body mold for expanding the glass to conformity with the internal cavity of said secondary mold.

30. Apparatus for forming hollow glassware, comprising a mold carrier mounted for rotation about a vertical axis, means to rotate said carrier, a plurality of neck molds and cooperable preliminary body molds on said carrier, independent means for opening and closing said neck molds and for bringing said body molds into and out of cooperation with said neck molds, means to form a glass blank in each pair of said neck molds and preliminary body molds, a carrier mounted for oscillation about said vertical axis, a secondary body mold on the last named carrier adapted to be closed into cooperative relation with each of said neck molds in succession, a vertically movable actuating member associated with each pair of neck and body molds on the first named carrier, a resiliently mounted member on the oscillating carrier adapted to be engaged by said actuating member when the latter is in its extended position, means for resiliently urging said actuating member to its extended position so that the oscillating carrier will be moved at the angular velocity of the first named carrier and in the same direction through a given zone in the movement of said first named carrier, means for retracting said actuating member to release said oscillating carrier, means including a pneumatic cylinder operated in response to the retraction of said actuating member for returning said oscillating carrier to its initial position for cooperation with the next succeeding neck mold upon the first named carrrier, and means for supplying fluid pressure through each of said neck rings when they are in cooperation with said secondary body mold for expanding the glass to conformity with the internal cavity of said secondary body mold.

31. Apparatus for forming hollow glassware, comprising a feed mold carrier mounted for rotation about a vertical axis, a blow mold carrier mounted for rotation about a vertical axis eccentric of the axis of said feed mold carrier, means to rotate said carriers continuously, a plurality of neck rings and associated feed molds mounted upon said feed mold carrier, a form mold carrier mounted for oscillation about the axis of said feed mold carrier, means operated in response to the rotation of said feed mold carrier for oscillating said form mold carrier through a predetermined zone adjacent to the path of travel of said neck rings, a form mold on said form mold carrier cooperable with each of said neck rings in succession, means to form feed blanks in each of said neck rings and cooperating feed molds, means to remove said feed molds from about the formed feed blanks to leave them depending from said neck rings, means for closing said form mold about each feed blank in succession and into cooperation with the neck ring from which it depends, means to apply fluid pressure through said neck rings successively to expand the feed blanks to conformity with the cavity of said form mold and thereby to form parisons, means to open said form mold leaving the parisons suspended from the neck rings in which they are respectively formed, a plurality of blow molds on said blow mold carrier, means for automatically transferring each of said formed parisons to said blow molds in succession, and means for blowing said parisons to final form in said blow molds.

KARL E. PEILER.